(12) United States Patent
Frank (10) Patent No.: US 6,371,572 B1
(45) Date of Patent: Apr. 16, 2002

(54) EMERGENCY STEERING WHEEL BRAKING SYSTEM

(76) Inventor: Donald E. Frank, 2934 60th Ave. S., St. Petersburg, FL (US) 33712

( * ) Notice: Subject to any disclaimer, the term of this patent is extended or adjusted under 35 U.S.C. 154(b) by 0 days.

(21) Appl. No.: 09/837,135

(22) Filed: Apr. 18, 2001

Related U.S. Application Data

(60) Provisional application No. 60/202,960, filed on May 9, 2000, and provisional application No. 60/234,582, filed on Sep. 22, 2000.

(51) Int. Cl.$^7$ ................................................ B60T 13/66
(52) U.S. Cl. ........................ 303/20; 303/124; 74/484 R
(58) Field of Search ............................. 303/124, 20, 3, 303/15; 280/264, 750; 74/484 R, 489; 200/61.57

(56) References Cited

U.S. PATENT DOCUMENTS

| | | | | | |
|---|---|---|---|---|---|
| 2,211,131 A | * | 8/1940 | Knauber | ...................... | 200/59 |
| 2,946,869 A | * | 7/1960 | Parks et al. | .............. | 200/61.57 |
| 3,304,801 A | * | 2/1967 | Sakita et al. | .................. | 74/552 |
| 4,792,783 A | * | 12/1988 | Burgess | ........................ | 340/22 |
| 5,085,098 A | * | 2/1992 | Buckley | ...................... | 74/558 |
| 5,707,262 A | * | 1/1998 | Huntley | ........................ | 440/61 |
| 5,746,950 A | * | 5/1998 | De Fillippo | .............. | 200/61.54 |
| 5,969,616 A | * | 10/1999 | Tschoi | ........................ | 340/576 |
| 6,068,352 A | * | 5/2000 | Kulkarni et al. | .............. | 303/20 |
| 6,218,947 B1 | * | 4/2001 | Sutherland | .................. | 340/576 |
| 6,246,808 B1 | * | 6/2001 | Mallon | ........................ | 385/16 |

* cited by examiner

*Primary Examiner*—Christopher P. Schwartz
*Assistant Examiner*—Benjamin A. Pezzlo (57) ABSTRACT

A trailer brake control system comprises a trailer. The trailer has brakes. The trailer also has a secondary electrical receiver. A towing vehicle is also provided. The vehicle has a steering wheel. The vehicle also has a secondary electrical transmitter. A steering wheel cover having a primary wireless signal transmitter is provided. The signal transmitter has a power source and a flexible torus-shaped tube. The tube has a hollow bore. Secured within the bore are a pair of wires, one flat and one toothed, offset from each other. Both wires are electronically coupled to the primary signal transmitter. A trailer brake processor is provided next. The brake processor has a trailer brake actuating switch. The actuating switch is electrically coupled with the brakes of the trailer. A primary signal receiver is coupled to the actuating switch and adapted to receive signals from the primary signal transmitter. A manual switch is also coupled to the actuating switch.

21 Claims, 7 Drawing Sheets

EMERGENCY STEERING WHEEL BRAKING SYSTEM

RELATED APPLICATIONS

The present invention is a continuation-in-part of provisional patent application Ser. No. 60/202,960 filed May 9, 2000 and provisional patent application Ser. No. 60/234,582 filed Sep. 22, 2000. The subject matter of such co-pending prior patent applications is incorporated herein by reference.

BACKGROUND OF THE INVENTION

1. Field of the Invention

The present invention relates to an emergency steering wheel braking system and more particularly pertains to rapidly and instinctively applying a braking force to trailer brakes only in an emergency situation such as fish-tailing. More specifically, the present invention relates to a trailer brake control system and more particularly pertains to rapidly and instinctively applying a braking force to just the trailer brakes in an emergency situation such as fish-tailing. The primary cause of trailer rollovers is the driver's inability to rapidly abort fish-tailing. The present invention eliminates driver inefficiency in the aforementioned regard. The present invention eliminates fish-tailing more rapidly and instinctively than any known prior art. Fish-tailing refers to having the rear end slide from side to side out of control while moving forward. Instinctively refers to the tendency to make a complex and specific response to environmental stimuli without involving reason.

2. Description of the Prior Art

The use of trailer and brake combinations of known designs and configurations is known in the prior art. More specifically, trailer and brake combinations of known designs and configurations previously devised and utilized for the purpose of safely braking a trailer though conventional methods and apparatuses are known to consist basically of familiar, expected, and obvious structural configurations, notwithstanding the myriad e of designs encompassed by the crowded prior art which has been developed for the fulfillment of countless objectives and requirements.

By way of example, U.S. Pat. No. 5,747,683 to Gerum et al discloses a method of drive stability enhancement of multiunit vehicles. U.S. Pat. No. 6,068,352 to Kulkarni discloses a microprocessor-based control for trailer brakes. Lastly, U.S. Pat. No. D436,932 to Roth discloses a design for an electronic controller for towed vehicle brakes.

A controller for the application of braking forces only to a trailer, as during an emergency situation, such as gusts and crosswinds, requires a driver to keep one hand on the steering wheel while moving the other hand to a trigger-like mechanism on the controller. Such action by a driver is not a normal; or instinctive, reaction to an emergency situations since a normal or instinctive reaction would be to keep both hands on the steering wheel in an effort to overcome fish-tailing which often results in an accident with damage or total loss to the vehicles and injury or death to the driver and passengers.

While these devices fulfill their respective, particular objectives and requirements, the aforementioned patents do not describe a trailer brake control system that allows rapid and instinctive application of a braking force to a trailer in an emergency situation.

In this respect, the trailer brake control system according to the present invention substantially departs from the conventional concepts and designs of the prior art, and in doing so provides an apparatus primarily developed for the purpose of rapidly and instinctively applying a braking force to a trailer in an emergency situation or to prevent an emergency situation by pre-applying the trailer brakes.

Therefore, it can be appreciated that there exists a continuing need for a new and improved trailer brake control system which can be used for rapidly and instinctively applying a braking force to a trailer in an emergency situation. In this regard, the present invention substantially fulfills this need.

SUMMARY OF THE INVENTION

In view of inherent disadvantages in known types of trailer and brake combinations of conventional designs and configurations now present in the prior art, the present invention provides an improved trailer brake control system. As such, the general purpose of the present invention, which will be described subsequently in greater detail, is to provide a new and improved trailer brake control system and method which has all the advantages of the prior art and none of the disadvantages.

To attain this, the present invention essentially comprises a trailer. The trailer has electrically operated brakes. The trailer also has a secondary electrical receiver. Provided next is a towing vehicle. The vehicle has a steering wheel and a dashboard. The vehicle also has a secondary electrical transmitter. The steering wheel is in a torus-shaped configuration with an outer periphery. The secondary transmitter of the vehicle is electrically coupled to the secondary receiver of the trailer. The vehicle is adapted to pull the trailer. Next provided is a steering wheel cover. The steering wheel cover is coupled around the outer periphery of the steering wheel of the vehicle. The steering wheel cover has an elastomeric, flexible, resilient, hollow sheath. The sheath is in a circular configuration. The sheath has a first edge, second edge, interior face, exterior face and inner cavity. The first and second edges form a slit. The slit runs the entire circumference of the cover. In this manner, the cover fits over the steering wheel. The cover supports a primary wireless signal transmitter. The primary wireless signal transmitter has a power source. The power source is coupled to the first edge of the outer face of the steering wheel cover. The cover supports an elastomeric, flexible and resilient tube. The resilient tube has an exterior surface. The tube is coupled to the entire first edge of the exterior face of the cover. The tube has a hollow bore. The hollow bore runs the entire distance of the tube. The tube has a top region. The tube also has a bottom region. A first flat wire is secured within the bore. A second toothed wire is secured within the bore. The second wire is toothed and is circumferentially offset diametrically spaced from the first flat wire by 180 degrees. The first wire is a negative conductor, preferably. The first wire runs along the top region. The second wire is a positive conductor, preferably. The second wire runs along the bottom portion. The first and second wires are spaced away from each other when in the resting state. The first and second wires are electrically coupled to the wireless primary signal transmitter. The tube has a ridge. The ridge runs the entire distance of the exterior surface of the tube and faces away from the exterior face of the cover. The ridge is adapted to facilitate the activation of the system. Activation occurs when the ridge on the tube is compressed by the thumb or thumbs of a driver of the vehicle. The first and second wires are then in contact and cause a closing of a circuit. In this manner, the primary signal transmitter generates a wireless signal. The steering wheel cover has a plurality of gripping regions. Last provided is a trailer brake processor. The trailer brake processor has a trailer brake actuating switch. The trailer brake actuating switch is electrically coupled with the brakes of the trailer via the connection made between the secondary wired transmitter of the vehicle and the secondary wired receiver of the trailer. The trailer brake processor is coupled to the dashboard of the vehicle and coupled to the vehicle's electrical and braking systems. The trailer brake processor has a primary wireless signal receiver. The primary wireless signal receiver receives signals from the primary wireless signal transmitter. The primary wireless signal receiver is coupled to the trailer brake actuating switch. A user can trigger the switch from the steering wheel cover by applying thumb pressure to the ridge on the tube. A spring urged manual switch on the trailer brake processor is an alternate operational component. In this manner, a user may, instead, activate the trailer brake actuating switch directly.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is, therefore, the primary object of the present invention to help prevent injury or death and property loss.

It is another object of the present invention to provide a new and improved trailer brake control system which has all of the advantages of the prior art trailer and brake combinations of known designs and configurations and none of the disadvantages.

It is another object of the present invention to provide a new and improved trailer brake control system which may be easily and efficiently manufactured and marketed.

It is further object of the present invention to provide a new and improved trailer brake control system which is of durable and reliable constructions.

An even further object of the present invention is to provide a new and improved trailer brake control system which is susceptible of a low cost of manufacture with regard to both materials and labor, and which accordingly is then susceptible of low prices of sale to the consuming public, thereby making such trailer brake control system economically available to the buying public and encompassing recreational trailers as well as commercial trailers.

Even still another object of the present invention is to provide a trailer brake control system for rapidly and instinctively applying a braking force only to trailer brakes in emergency situations.

Lastly, it is an object of the present invention to provide a new and improved trailer brake control system comprising a trailer. The trailer has brakes. The trailer also has a secondary electrical receiver. A towing vehicle is also provided. The vehicle has a steering wheel. The vehicle also has a secondary electrical transmitter. A steering wheel cover, supporting a primary wireless signal transmitter, is provided. The wireless signal transmitter has a power source and a flexible torus-shaped tube. The tube has a hollow bore. Secured within the bore are one flat negative wire and one toothed positive wire, offset from each other. Both wires are coupled to the primary wireless signal transmitter. A trailer brake processor is provided next. The brake processor has a trailer brake m actuating switch. The actuating switch is electrically coupled with the brakes of the trailer. A primary wireless signal receiver is coupled to the actuating switch and adapted to receive signals from the primary wireless signal transmitter. A manual slide lever or button functioning as a trigger is also coupled to the actuating switch as another method of only applying the trailer brakes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

With reference now to the drawings, and in particular to FIGS. 2–9 thereof, the preferred embodiment of the new and improved trailer brake control system embodying the principles and concepts of the present invention and generally designated by the reference numeral 10 will be described.

The present invention, the trailer brake control system 10 is comprised of a plurality of components. Such components in their broadest context include a trailer having electrically actuated brakes, a towing vehicle, a steering wheel cover, and a trailer brake processor. Such components are individually configured and correlated with respect to each other so as to attain the desired objective.

Figure 1:
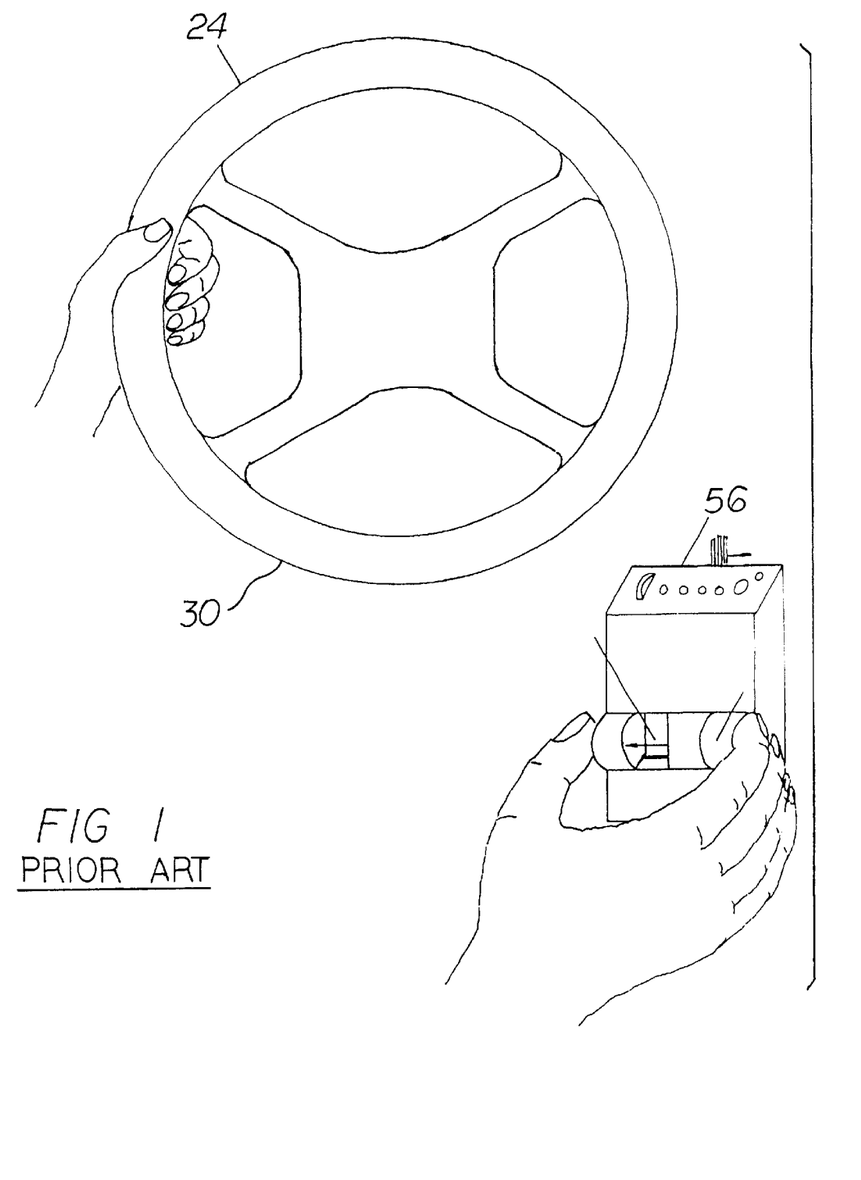
FIG. 1 is a front view of a steering wheel associated with the trailer brake control system of the prior art.
Figure 2:
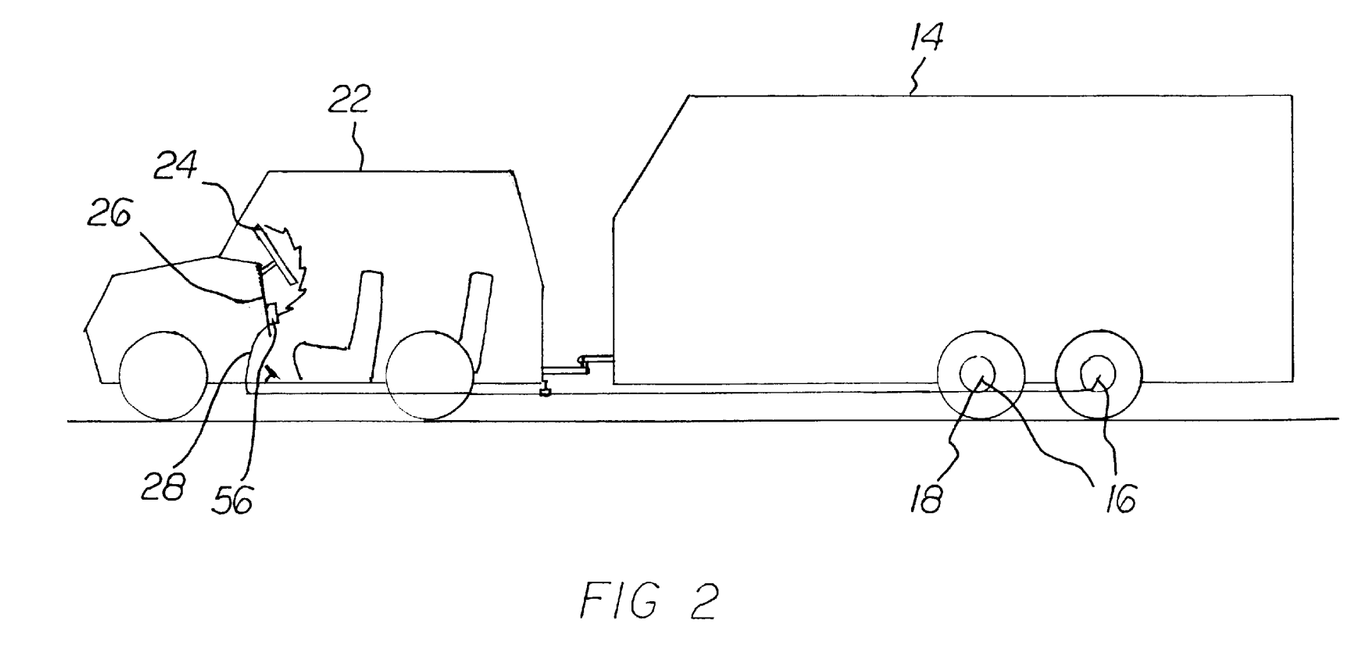
FIG. 2 is a side elevational view of a trailer brake system associated with the present invention.

First provided is a trailer 14. The trailer has brakes 16. and a secondary electrical receiver 18.

Provided next is a towing vehicle 22. The towing vehicle has a steering wheel 24 and a dashboard 26. The vehicle also has a secondary electrical transmitter 28. The steering wheel is in a torus-shaped configuration with an outer periphery 30. The secondary transmitter of the vehicle is electrically coupled with the secondary receiver of the trailer, primarily using wires but being adapted to other known methods. The vehicle is adapted to pull the trailer.

Figure 3:
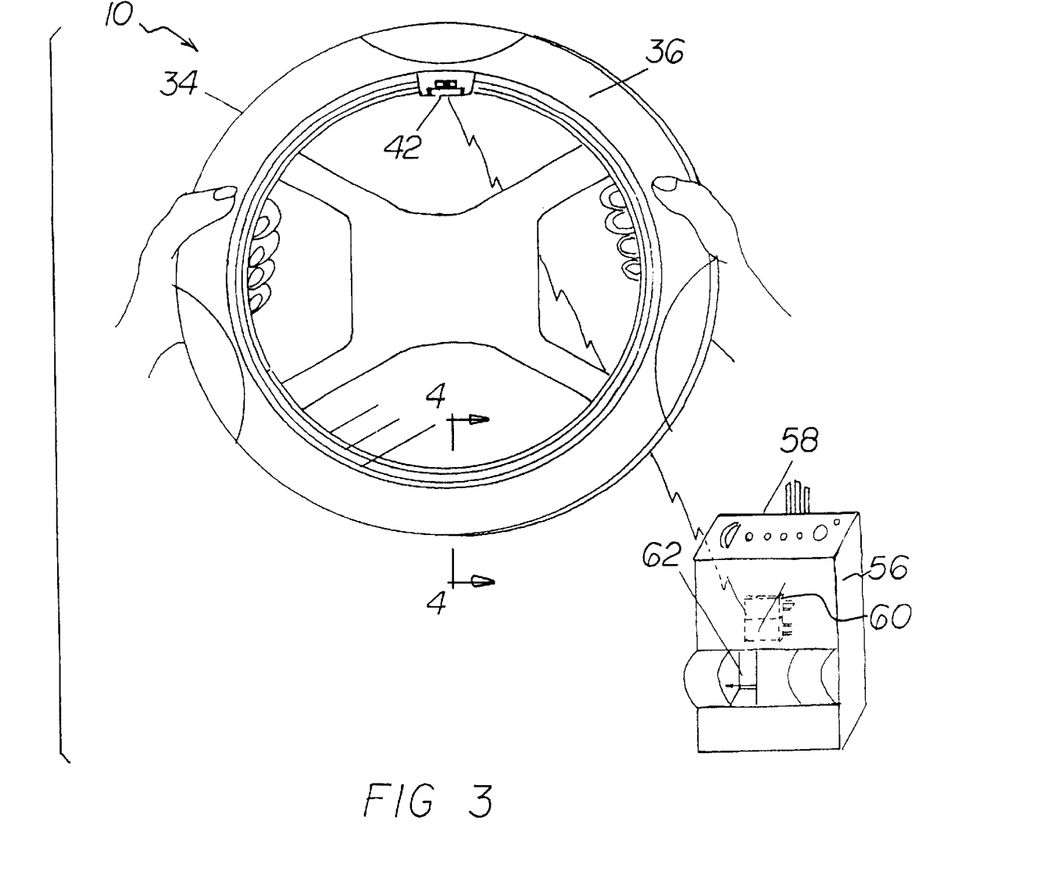
FIG. 3 is a perspective illustration of a trailer brake processor and steering wheel cover associated with the present invention.
Figure 4:
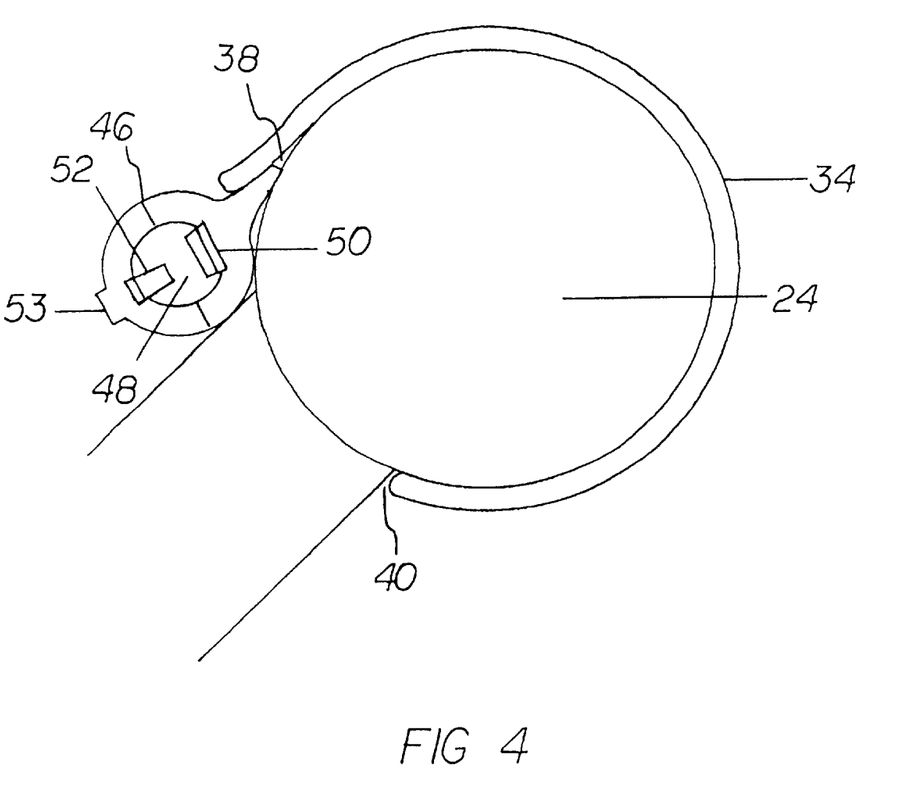
FIG. 4 is a cross sectional view of a steering wheel and steering wheel cover with attached flexible tube of the present invention.
Figure 5:
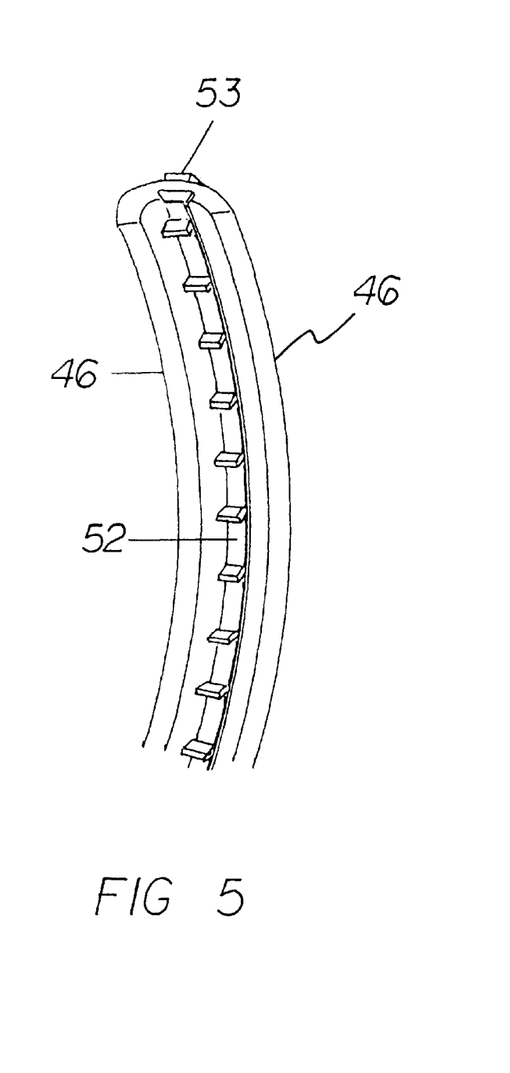
FIG. 5 is a perspective illustration of the bottom region of the flexible tube associated with the present invention.
Figure 6:
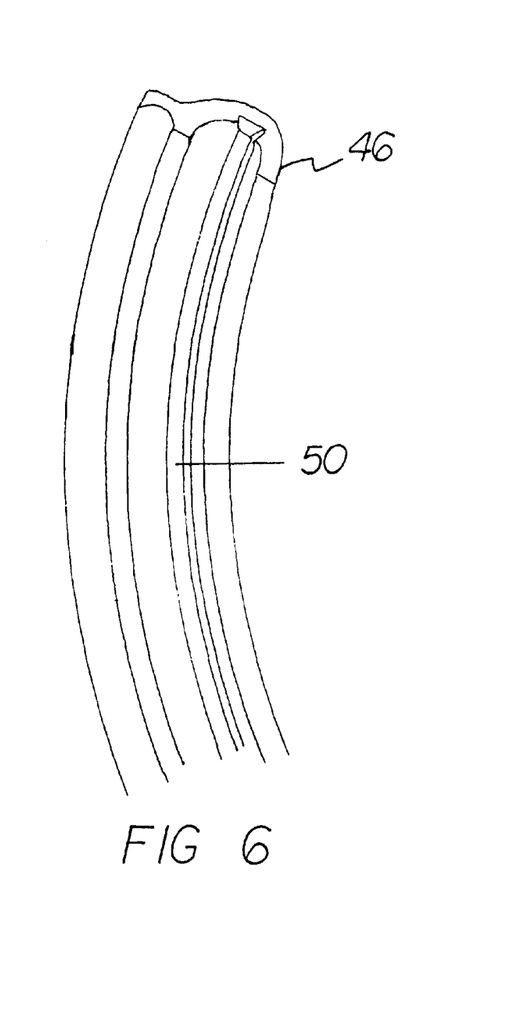
FIG. 6 is a perspective illustration of the top region of the flexible tube associated with the present invention.
Figure 7:
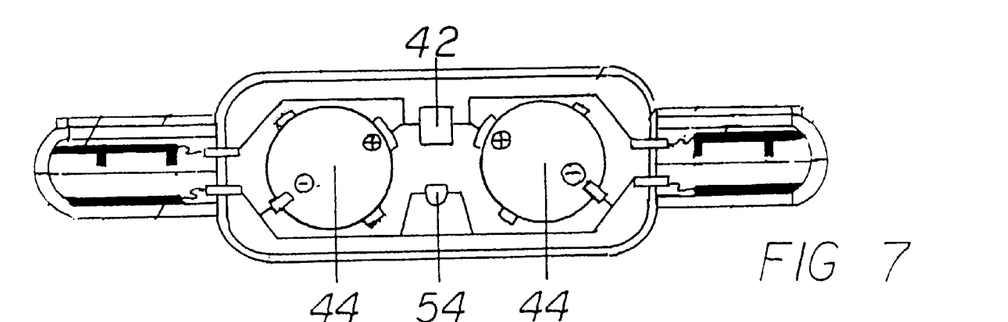
FIG. 7 is an cross sectional view of the case showing the primary wireless transmitter and warning or signal light of the present invention.
Figure 8:
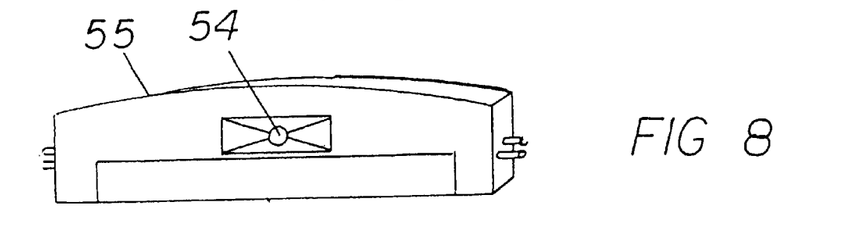
FIG. 8 is perspective view of the case associated with the components of FIG. 7.
Figure 9:
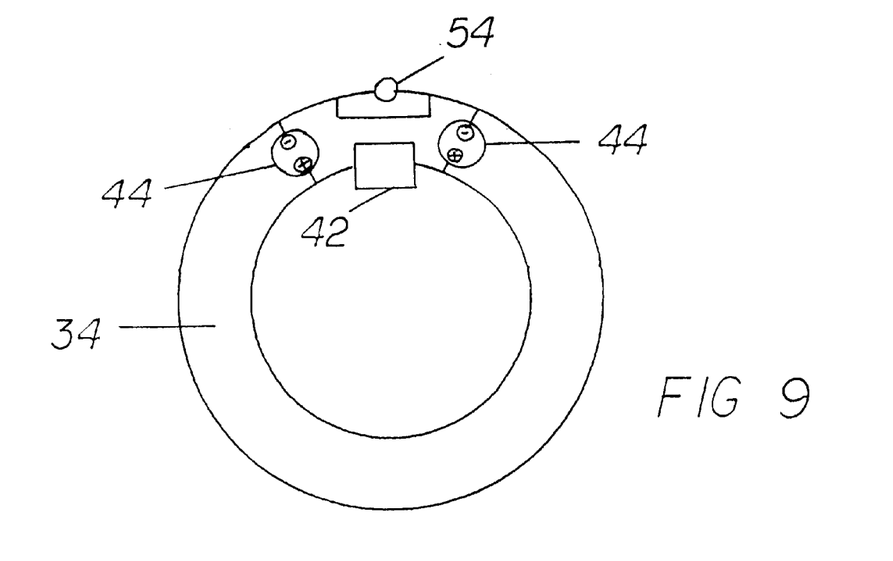
FIG. 9 is a schematic illustration of the steering wheel cover showing the power source, transmitter and warning or signal light of FIGS. 7 and 8.

Next provided is a steering wheel cover 34. The steering wheel cover is coupled around the outer periphery of the steering wheel of the vehicle. The steering wheel cover has an elastomeric, flexible, resilient, hollow sheath 36. The sheath is in a circular configuration. The sheath has a first edge, second edge, interior face, exterior face and inner cavity 38. The first and second edges form a slit 40. The slit runs the entire circumference of the cover. In this manner, the cover fits over the steering wheel cover. The cover supports a primary wireless signal transmitter 42. The primary wireless signal transmitter has a power source 44. The power source is coupled to the steering wheel cover. The cover has an elastomeric, flexible and resilient tube 46. The resilient tube has an exterior surface. The tube is coupled to the entire first edge of the exterior face of the cover. The tube has a hollow bore 48 with an insulating air space. The hollow bore runs the entire distance of the tube. The tube has a top region. The tube also has a bottom region. These regions of the tube can be made of separate components that are coupled together or as a single component. Although the tube with the electrical wires is shown as formed of a two piece construction to facilitate fabrication, the tube may be fabricated as a single piece with the electrical wires formed securely within.

A first flat wire 50 is secured within the bore. A second toothed wire 52 is secured within the bore. The second wire is formed with fingers or teeth circumferentially offset diametrically spaced from the first flat wire by 180 degrees. The first wire is a negative conductor. The first wire runs along the top region. The second wire is a positive conductor. The second wire runs along the bottom portion. The first and second wires are spaced away from each other when in the resting state. The first and second wires are electrically coupled to the primary signal transmitter. The wire may be formed with electrically conductive fingers or teeth to facilitate the electrical contact of the wire during the activation of the system. The tube has a ridge 53. The ridge runs the entire distance of the exterior surface of the tube and faces away from the exterior face of the cover. The ridge is adapted to facilitate the activation of the system. Activation occurs when the ridge on the tube is compressed by the thumb or thumbs of a driver of the vehicle. The system only activates as long as the driver is applying force on the tube. The first and second wires are then in contact and cause a closing of a circuit. In this manner, the primary signal transmitter generates a wireless signal. The steering wheel cover has a plurality of gripping regions. A generic cover is merely a means for mounting the present invention to a steering wheel. A unintentional braking warning light 54 is further provided to indicate when the system is being activated and also indicates battery strength. The power source, transmitter and warning light all reside in a case 55 mounted to the steering wheel cover.

Last provided is a trailer brake processor 56. The trailer brake processor has a trailer brake actuating switch 58. The trailer brake actuating switch is electrically coupled with the brakes of the trailer via the connection made between the secondary transmitter of the vehicle and the secondary receiver of the trailer. The trailer brake processor is coupled to the dashboard of the towing vehicle and is also coupled to the electrical and braking systems. The trailer brake processor has a primary wireless signal receiver 60. The primary signal receiver receives signals from the primary signal transmitter on the steering wheel cover. The primary wireless signal receiver is coupled to the trailer brake actuating switch. A user can trigger the switch from the steering wheel cover by applying thumb pressure on the tube ridge. A spring urged manual switch 62 on the trailer brake processor is an alternate operational component. In this manner, a user may activate the trailer brake actuating switch directly.

Although the primary signal from the steering wheel to the processor on the dashboard is preferably wireless by radio waves, with conventional antennas at the transmitter and receiver, the secondary signal from the processor to the brakes of the trailer is preferably by a wiring harness with a connector between the trailer the towing vehicle. Appropriate coder/decoder components are preferably utilized in association with the wireless signals. Such components preclude extraneous signals from improperly activating or interfering with the present systems. Conversely, such components preclude the present system from activating or interfering with extraneous systems.

For normal stops or slowdown the trailer brake processor synchronizes the trailer brakes with the towing vehicle brake. Drivers accomplishes this by making test stops and adjusting the controller. However, in the event of fish-tailing or swaying, caused by the vortex of passing semi-trailers, other large vehicles, a tire blowout, or cross winds, it is necessary to quickly apply trailer brakes only. This brings the trailer back in line with the towing vehicle. Applying the towing vehicle brake almost always causes the entire rig to jack-knife and possibly overturn. The prior art requires the driver to remember to remove one hand form the steering wheel, grope for, hopefully find the manual slide and hand activate it while under the stress of a towing vehicle being turbulent. Upon the first indication of fish-tailing, the present invention requires only the thumb force of the driver to rapidly and instinctively compress the flexible tube thereby activating the system. Even a passenger, in the event of driver incapacity, could steer and activate the system simultaneously. The present invention would enable one armed drivers to safely activate the system.

Figure 10:
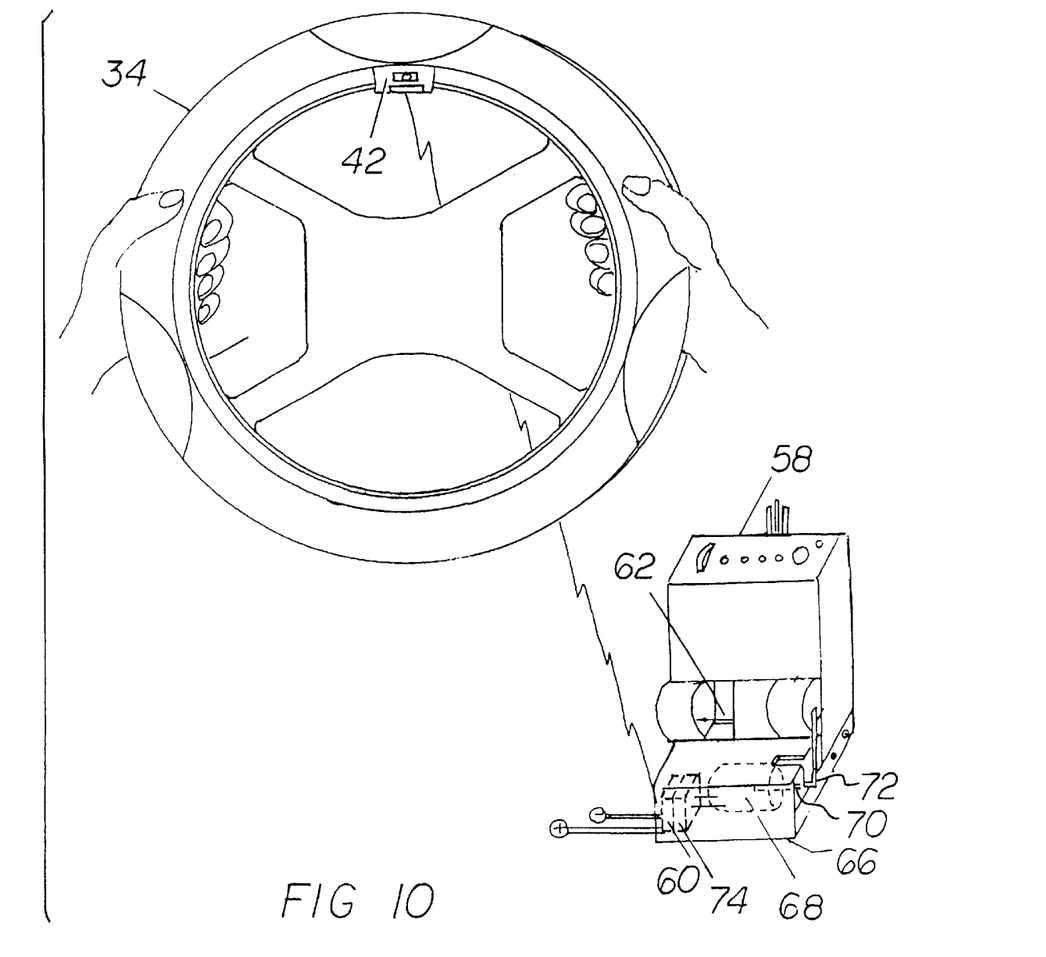
FIG. 10 is front view of an alternative embodiment of the present invention.

An alternate embodiment of the invention includes a trailer brake control system as set forth hereinabove. Also included is a solenoid housing 66. The solenoid housing is coupled to the processor adjacent to the manual switch. Further included is a solenoid 68. The solenoid has a movable piston 70. The movable piston has an activation arm 72. The activation arm is coupled to the movable piston. The activation arm abuts the manual switch. The solenoid housing has an associated primary wireless signal receiver 74 and a switching assembly operated by the primary signal receiver. The primary wireless signal receiver is electrically coupled with the solenoid. The alternative embodiment having a light to warn the driver of unintentional trailer braking as well as providing a means for checking battery strength.

The present invention constitutes a technique to abate dangerous fish-tailing of a trailer under emergency situations. Such new technique, which simply involves the grasping of a steering wheel, is both natural and instinctive when a driver is faced with an emergency. Such new technique is also more rapid than prior techniques since there is no moving of one hand from the steering wheel or searching for a trigger mechanism on the controller. Two handed steering is the safest steering. In addition, unlike prior techniques, the present invention is even more suitable for operation by a passenger in the event that the driver becomes incapacitated. The present invention is also suitable for operation by a one-armed driver.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer brake control system comprising:
   a trailer having electrically actuated brakes and an electrical receiver;
   a towing vehicle having a steering wheel and an electrical transmitter, the steering wheel having a flexible generally torus-shaped tube with a hollow bore having a pair of wires circumferentially offset from each other within the bore and with both wires being electrically coupled to the signal transmitter whereby when a driver applies pressure to the tube, the wires contact each other and the transmitter signals the receiver to apply a braking force to the brakes of the trailer.

2. A trailer brake control system for rapidly and instinctively applying a braking force to a trailer in an emergency situation comprising, in combination:
   a trailer having electrically activated brakes and a secondary electrical receiver;
   a vehicle having a steering wheel and a dashboard and secondary electrical transmitter, the steering wheel having a torus shaped configuration with an outer periphery, and with the secondary transmitter of the vehicle being electrically coupled with the secondary receiver of the trailer, the vehicle being adapted to pull the trailer;
   a steering wheel cover coupled around the outer periphery of the steering wheel of the vehicle, the steering wheel cover having an elastomeric, flexible, resilient, hollow sheath of a circular configuration with a first edge, second edge, interior face, exterior face and inner cavity, the first and second edges forming a slit running the entire circumference of the cover enabling the cover to be fit over the steering wheel, the cover supporting a primary wireless signal transmitter with a power source coupled to the steering wheel cover, the cover further supporting an elastomeric, flexible and resilient tube with an exterior surface, the tube being coupled to the entire first edge of the exterior face with the tube further having a hollow bore running the entire distance of the tube, the tube having a top region and bottom region with a first flat wire secured within the bore and a second toothed wire secured within the bore circumferentially offset diametrically spaced from the first flat wire by 180 degrees, the first wire being a negative conductor running along the top region and the second toothed wire being a positive conductor running along the bottom portion both being spaced away from each other when in the resting state and both wires being coupled to the primary wireless signal transmitter, the tube also having a ridge running the entire distance of the exterior surface of the tube and facing away from the exterior face of the cover, the ridge being adapted to facilitate the activation of the system, activation occurring when the tube is compressed by a driver of the vehicle thereby drawing the first and second wires into contact and causing a closing of a circuit and enabling the primary signal transmitter to generate a wireless signal, the steering wheel cover further having a plurality of gripping regions; and
   a trailer brake processor having a trailer brake actuating switch being electrically coupled with the brakes of the trailer via the connection made between the secondary transmitter of the vehicle and the secondary receiver of the trailer, the trailer brake processor being coupled to the dashboard and to the electrical and braking systems of the vehicle, and having a primary wireless signal receiver adapted to receive signals from the primary wireless signal transmitter on the steering wheel cover and with the primary wireless signal receiver being coupled to the trailer brake actuating switch enabling a user to trigger the switch from the steering wheel cover, in addition as an alternative operational component, and a spring urged manual switch on the trailer brake processor enabling a user to activate the trailer brake actuating switch directly.

3. A trailer brake control system comprising:
   a trailer having electrically actuated brakes and a secondary electrical receiver;
   a towing vehicle having a steering wheel and a secondary electrical transmitter;
   a steering wheel cover having a primary wireless signal transmitter with a power source, and a flexible generally torus-shaped tube with a hollow bore having a pair of wires offset from each other within the bore and with both wires being electrically coupled to the primary wireless signal transmitter; and
   a trailer brake processor having a trailer brake actuating switch being electrically coupled with the brakes of the trailer and a primary wireless signal receiver being coupled to the trailer brake actuating switch and adapted to receive signals from the primary wireless signal transmitter and a manual switch also coupled to the trailer brake actuating switch.

4. The trailer brake control system as set forth in claim 3 and further including a spring urged manual switch on the trailer brake processor enabling a user to activate the trailer brake actuating switch directly.

5. The trailer brake control system as set forth in claim 3 and further including a solenoid housing coupled to the processor adjacent to the manual switch, a solenoid with a movable piston with an activation arm coupled thereto and abutting the manual switch, the solenoid housing having a primary wireless signal receiver coupled to the primary wireless signal transmitter and being electrically coupled with the solenoid.

6. The trailer brake control system as set forth in claim 3 wherein the steering wheel cover further having a plurality of gripping regions.

7. The trailer brake control system as set forth in claim 3 wherein the tube having a ridge.

8. The trailer brake control system as set forth in claim 3 further comprising a braking warning light electrically coupled to the primary wireless signal transmitter to alert the user that the system has been activated and the light source strength representing power source strength.

9. The trailer brake control system as set forth in claim 3 further comprising a power source/transmitter/warning light case. to protect these component from day to day use of the steering wheel.

10. The trailer brake control system as set forth in claim 3 wherein the coupling between the trailer brake actuating switch and the brakes of the trailer being a plurality of wires.

11. The trailer brake control system as set forth in claim 3 wherein the coupling between the trailer brake actuating switch and the brakes of the trailer being signals between a secondary electrical transmitter and a secondary electrical receiver.

12. The trailer brake control system as set forth in claim 3 wherein one of the pair of wires having teeth to facilitate the wires making contact during activation.

13. A trailer brake control system comprising:
a trailer having electrically activated brakes and a secondary electrical receiver;
a towing vehicle having a steering wheel, a dashboard and secondary electrical transmitter, the steering wheel having a torus shaped configuration with an outer periphery, the vehicle being adapted to pull the trailer, the towing vehicle also having a secondary electrical transmitter electrically coupled with the secondary receiver of the trailer;
a steering wheel cover being adapted to couple around the outer periphery of the steering wheel of the vehicle, the steering wheel cover having an elastomeric, flexible, resilient and hollow sheath of a circular configuration with a first edge, second edge, interior face, exterior face and inner cavity, the first and second edges form a slit running the entire circumference thereof enabling the cover to be fit over the steering wheel, the cover supports a primary wireless signal transmitter with a power source, the cover further supporting an elastomeric, flexible and resilient tube having an exterior surface, the tube being coupled to the entire first edge of the exterior face of the cover with the tube having a hollow bore running the entire distance of the tube, the tube having a top region and bottom region with a first flat wire secured within the bore and a second toothed wire secured within the bore circumferentially offset from the first flat wire by 180 degrees, the first wire being a negative conductor running along the top region and the second wire being a positive conductor running along the bottom portion both being spaced away from each other in the resting state and both wires being electrically coupled to the primary wireless signal transmitter, the tube also having a ridge running the entire distance of the exterior surface of the tube and facing away from the exterior face of the cover, the ridge being adapted to encourage efficient activation of the system, activation occurring when the tube is compressed drawing the first and second wires into contact causing a closing of a circuit and enabling the primary wireless signal transmitter to generate a signal, the steering wheel cover further having a plurality of gripping regions;
a trailer brake processor being coupled to the dashboard and to the electrical and braking systems of the vehicle, the processor having a trailer brake actuating spring urged manual switch being coupled with the brakes of the trailer via the connection made between the secondary electrical transmitter of the vehicle and the secondary electrical receiver of the trailer; and
a solenoid housing having a pair of support flanges adapted to couple to the processor adjacent to the manual switch utilizing a plurality of screws, a solenoid with a movable piston with an activation arm coupled thereto, an aperture in the housing to allow the abutment of an activation arm with the manual switch such aperture being long enough to allow the activation arm to move the entire length of the switch action, the solenoid housing having a primary signal receiver adapted to receive signals from the primary wireless signal transmitter of the steering wheel cover and being electrically coupled with the solenoid such that when a user activates the system, the primary wireless transmitter transmits a signal to the primary wireless receiver of the processor, the primary wireless receiver, when energized, adapted to move the solenoid which activates a manual override trigger.

14. A trailer brake control system comprising:
a trailer having brakes and a second electrical receiver;
a towing vehicle having a steering wheel and secondary electrical transmitter;
a steering wheel cover being adapted to couple to the steering wheel, the steering wheel cover supporting a primary wireless signal transmitter with a power source, the cover further supporting a flexible tube with a hollow bore with a pair of wires secured therein with the wires being offset from each other and electrically coupled to the primary wireless signal transmitter;
a trailer brake processor having a trailer brake actuating switch being electrically coupled with the brakes of the trailer; and
a solenoid housing coupled to the processor adjacent to the manual switch, a solenoid with a movable piston with an activation arm couple thereto and abutting the manual switch, the solenoid housing having a primary wireless signal receiver and a switching assembly operated by the primary wireless signal transmitter and being electrically coupled with the solenoid.

15. The trailer brake control system as set forth in claim 14 and further having a ridge running the entire distance of the tube.

16. The trailer brake control system as set forth in claim 14 and further having a plurality of gripping regions.

17. The trailer brake control system as set forth in claim 14 further comprising a braking warning light electrically coupled to the primary wireless signal transmitter to alert the user that the system has been activated and the light source strength representing power source strength.

18. The trailer brake control system as set forth in claim 14 further comprising a power source/transmitter/warning light case to protect these component from day to day use of the steering wheel.

19. The trailer brake control system as set forth in claim 14 wherein the coupling between the trailer brake actuating switch and the brakes of the trailer being a plurality of wires.

20. The trailer brake control system as set forth in claim 14 wherein the coupling between the trailer brake actuating switch and the brakes of the trailer being signals between a secondary transmitter and a secondary receiver.

21. The trailer brake control system as set forth in claim 14 wherein one of the pair of wires having teeth to facilitate the wires making contact during activation.

* * * * *